United States Patent
Pieper et al.

(10) Patent No.: US 12,543,654 B2
(45) Date of Patent: Feb. 10, 2026

(54) PRE-CUTTER ASSEMBLY FOR BALER IMPLEMENT

(71) Applicant: DEERE & COMPANY, Moline, IL (US)

(72) Inventors: Mark A. Pieper, Ottumwa, IA (US); Darin L. Roth, Batavia, IA (US)

(73) Assignee: DEERE & COMPANY, Moline, IL (US)

( * ) Notice: Subject to any disclaimer, the term of this patent is extended or adjusted under 35 U.S.C. 154(b) by 434 days.

(21) Appl. No.: 18/311,931

(22) Filed: May 4, 2023

(65) Prior Publication Data

US 2024/0365719 A1 Nov. 7, 2024

(51) Int. Cl.
*A01D 90/04* (2006.01)
*A01F 15/10* (2006.01)
*A01F 29/08* (2006.01)
*A01F 29/09* (2010.01)

(52) U.S. Cl.
CPC .............. *A01D 90/04* (2013.01); *A01F 15/10* (2013.01); *A01F 29/08* (2013.01); *A01F 29/09* (2013.01)

(58) Field of Classification Search
CPC .......... A01F 29/14; A01F 15/04; A01F 29/08; A01F 15/10; A01F 2015/107; A01F 2015/108; A01F 29/01; A01F 29/02; A01F 29/095; A01F 29/09; A01F 29/16; A01F 29/00; A01D 90/04; A01D 2085/007; A01D 85/005; A01D 87/0007; A01D 29/10
See application file for complete search history.

(56) References Cited

U.S. PATENT DOCUMENTS

| | | | |
|---|---|---|---|
| 9,468,149 B2 | 10/2016 | Derscheid et al. | |
| 10,462,974 B2 | 11/2019 | Schinstock | |
| 11,071,255 B2 | 7/2021 | Derscheid | |
| 11,576,309 B2 | 2/2023 | Mcclure | |
| 2014/0096692 A1* | 4/2014 | Baldauf | A01F 29/16 100/97 |
| 2015/0208586 A1 | 7/2015 | Lang et al. | |
| 2018/0027742 A1 | 2/2018 | Schinstock | |
| 2023/0189715 A1* | 6/2023 | Liefooghe | A01F 15/0841 100/142 |
| 2023/0200303 A1* | 6/2023 | Shenk | A01F 29/16 56/341 |

OTHER PUBLICATIONS

Extended European Search Report and Written Opinion issued in European Patent Application No. 24171170.4 dated Oct. 10, 2024, in 05 pages.

* cited by examiner

*Primary Examiner* — Brad Harcourt

(57) ABSTRACT

A pre-cutter assembly includes at least one knife rotatable about a knife rotation axis between a retracted position and a deployed position, and an associated engagement arm rotatable about an arm rotation axis between a latch position securing the knife in the deployed position, and a release position allowing the knife to move into the retracted position. A magnet may be positioned for engagement with the engagement arm when the engagement arm is disposed in the latch position. The magnet is operable to apply a magnetic force to the engagement arm when engaged with the engagement arm to hold the engagement arm in the latch position thereby securing the knife in the deployed position. A cam shaft having a cam lobe may be rotated to selectively move the engagement arm between the release position and the latch position.

19 Claims, 13 Drawing Sheets

PRE-CUTTER ASSEMBLY FOR BALER IMPLEMENT

TECHNICAL FIELD

The disclosure generally relates to a pre-cutter assembly for a baler implement, and a method of controlling the pre-cutter assembly.

BACKGROUND

A baler implement gathers cut crop material from a ground surface of a field, and then forms the crop material into a bale. The baler implement includes a bale forming system for forming the crop material into the bale. The bale forming system may be configured to form the bale into a parallelepiped shape, or a cylindrical shape. Generally, the bale forming system includes a baling chamber, which may alternatively be referred to as a compression chamber, within which the crop material is compressed into the desired shape of the bale.

The baler implement includes a pick-up mechanism. The pick-up mechanism is disposed proximate the forward end of the baler implement. The pick-up mechanism gathers crop material from the ground surface and directs the gathered crop material toward and into an inlet of the baling chamber of the baler implement. The pickup may include, but is not limited to tines, forks, augers, conveyors, baffles, etc., for gathering and moving the crop material.

The baler implement may be equipped with a pre-cutter assembly, which is disposed between the pickup and the inlet of the baling chamber. As such, the pre-cutter assembly is disposed downstream of the pickup and upstream of the inlet relative to a direction of movement of the crop material. The pre-cutter cuts or chops the crop material into smaller pieces.

The pre-cutter assembly may include a plurality of knifes and a plurality of engagement arms. Each respective one of the plurality of knives may be rotatable about a knife rotation axis between a retracted position and a deployed position. Each respective one of the plurality of engagement arms may be arranged for engagement with a respective one of the plurality of knives. Each respective one of the plurality of engagement arms is rotatable about an arm rotation axis between a release position and a latch position. When the knives are moved into their respective deployed position, the respective engagement arm associated therewith may be biased into its respective latch position by a spring to secure the associated knife in its deployed position. Spring tension holds the engagement arm in interlocking engagement with the knife, which in turn holds the knife in its deployed position. In response to a force applied to the knife having a magnitude greater than the spring tension, such as may occur when an object strikes or impacts the knife, the engagement arm may be moved out of interlocking engagement with the associated knife, thereby allowing the knife to drop down into its respective retracted position. By doing so, impact damage to the knife may be avoided.

The plurality of knives, and the respective engagement arms associated therewith, may be selected in sets or groups to define a desired cutting width between adjacent knives. For example, a first set of the plurality of knives may be selected and deployed to achieve a first cutting width between adjacent knives. The first set and a second set of the plurality of knives may both be selected and deployed to achieve a second cutting width between adjacent knives. It should be appreciated that the plurality of knives may include more than the example two sets of knives for providing more than the two different cutting widths noted herein. The different sets of knives, or combinations thereof, may be selected based on crop type, crop density, crop moisture, etc., to provide the desired cutting based on the properties of the crop material.

SUMMARY

A pre-cutter assembly for a baler implement is provided. The pre-cutter assembly includes a support structure. A knife is rotatable relative to the support structure for rotation about a knife rotation axis between a retracted position and a deployed position. An engagement arm is rotatable relative to the support structure for rotation about an arm rotation axis between a latch position securing the knife in the deployed position, and a release position allowing the knife to move into the retracted position.

In one implementation of the disclosure, the pre-cutter assembly may include a magnet is positioned for engagement with the engagement arm when the engagement arm is disposed in the latch position. The magnet is operable to apply a magnetic force to the engagement arm when engaged with the engagement arm to hold the engagement arm in the latch position thereby securing the knife in the deployed position.

In one implementation of the disclosure, the pre-cutter may include a plurality of knives, with each respective one of the plurality of knives rotatable relative to the support structure for rotation about a knife rotation axis between a retracted position and a deployed position. The pre-cutter may further include a plurality of engagement arms, with each respective one of the plurality of engagement arms arranged for engagement with a respective one of the plurality of knives. Each respective one of the plurality of engagement arms is rotatable relative to the support structure for rotation about an arm rotation axis between a release position and a latch position. A magnet is positioned for engagement with at least one of the plurality of engagement arms when the at least one of the plurality of engagement arms is disposed in its respective latch position. The magnet is operable to apply a magnetic force to the at least one of the plurality of engagement arms when engaged therewith for attracting the at least one of the plurality of engagement arms thereto.

In one implementation of the disclosure, the magnet is positioned for engagement with all of the plurality of engagement arms when each respective one of the plurality of engagement arms is disposed in its respective latch position. In this implementation, the magnet is operable to apply the magnetic force to each of the plurality of engagement arms when engaged therewith. In another implementation, the magnet may include a plurality of different magnets, with each individual magnet associated with one or a subset of the plurality of engagement arms.

In one aspect of the disclosure, the magnet may include an electromagnet operable to generate the magnetic force in response to an electric signal applied thereto. As such, the electromagnet may be activated by the electric signal to generate the magnetic force, and deactivated by disconnecting the electric signal to not generate the magnetic force.

In one aspect of the disclosure, the magnet is configured to generate the magnetic force to exhibit a defined magnitude. The magnetic force between the at least one of the plurality of engagement arms and the magnet may be breakable or overcome in response to an impact force applied to the respective one of the plurality of knives engaged with the at least one of the plurality of engagement arms and having a magnitude greater than the defined magnitude of the magnetic force. Accordingly, an impact against the respective one of the plurality of knives generating the impact force causes the at least one of the plurality of engagement arms engaged therewith to move into its release position and the respective one of the plurality of knives engaged with the at least one of the plurality of engagement arms to move into its retracted position.

In one aspect of the disclosure, each respective one of the plurality of knives may include notch, and each respective one of the plurality of engagement arms may include a portion shaped to mate with and engage the notch of the respective one of the plurality of knives engaged therewith. The portion of each respective one of the plurality of engagement arms may include, but is not limited to, a roller rotatably attached thereto.

In one implementation of the disclosure, the plurality of knives may include a first set of knives and a second set of knives. The first set of knives may be deployed to provide a first cutting width between adjacent knives. The second set of knives may be deployed to provide a second cutting width between adjacent knives. The first set of knives and the second set of knives may be deployed to provide a third cutting width between adjacent knives.

In one implementation of the disclosure, the pre-cutter assembly may include a cam shaft having a first set of cam lobes and a second set of cam lobes. Each of the first set of cam lobes is positioned for engaging a respective one of the plurality of engagement arms engaged with one of the first set of knives to move the respective engagement arm from its release position to its latch position. Each of the second set of cam lobes is positioned for engaging a respective one of the plurality of engagement arms engaged with one of the second set of knives to move the respective engagement arm from its release position to its latch position. By rotating the cam shaft to a first cam position, in which the first set of cam lobes are engaged with their associated engagement arms, the first set of knives may be deployed. By rotating the cam shaft to a second cam position, in which the second set of cam lobes are engaged with their associated engagement arms, the second set of knives may be deployed.

In one aspect of the disclosure, the cam shaft includes a neutral position in which none of the first set of cam lobes and the second set of cam lobes are engaged with a respective one of the plurality of engagement arms. With the cam shaft in its neutral position, all of the plurality of engagement arms may move into their respective release positions, whereby all of the plurality if knives may move into their respective retracted positions.

In one aspect of the disclosure, the pre-cutter assembly may further include an actuator coupled to the cam shaft and operable to rotate the cam shaft about a cam axis. The actuator may be operable to rotate the cam shaft in a first rotational direction about the cam axis and a second rotational direction about the cam axis, the second rotational direction being opposite the first rotational direction.

A method of controlling a pre-cutter assembly of a baler implement is also provided. The method includes positioning a set of a plurality of knives in a deployed position, and activating an electromagnet to generate a magnetic force to secure the set of the plurality of knives in the deployed position.

In one implementation of the method described herein, the method of controlling the pre-cutter assembly includes rotating a cam shaft about a cam axis from a neutral position to one of a first cam position and a second cam position. The cam shaft includes a first set of cam lobes and a second set of cam lobes. Each of the first set of cam lobes is positioned for engaging a respective one of a plurality of engagement arms engaged with one of a first set of knives to move the respective engagement arm from a release position to a latch position when in the first cam position. Each of the second set of cam lobes is positioned for engaging a respective one of the plurality of engagement arms engaged with one of a second set of knives to move the respective engagement arm from a release position to a latch position when in the second cam position. An electromagnet is activated to generate a magnetic force attracting the engagement arms engaged therewith, which is determined by the rotational position of the cam shaft being one of the first cam position or the second cam position. Once the electromagnet is activated, the cam shaft is rotated to the neutral position in which none of the first set of cam lobes and none of the second set of cam lobes are engaged with a respective one of the plurality of engagement arms.

In one implementation of the method of controlling the pre-cutter assembly, the electromagnet is deactivated prior to rotating the cam shaft from the neutral position to one of the first cam position and the second cam position.

Accordingly, the pre-cutter assembly described herein may use the cam shaft with multiple sets of lobes to actuate different sets of knives by rotating the cam shat to the desired position. Additionally, the pre-cutter assembly may use a magnet, such as an electromagnet, to secure the knives in the deployed position and provide the break-away impact resistance. The pre-cutter assembly disclosed herein enables a high number of closely packed knives to provide a narrower cutting width than was previously possible with prior art systems that used springs to secure the knives in the deployed position and provide the break-away force.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
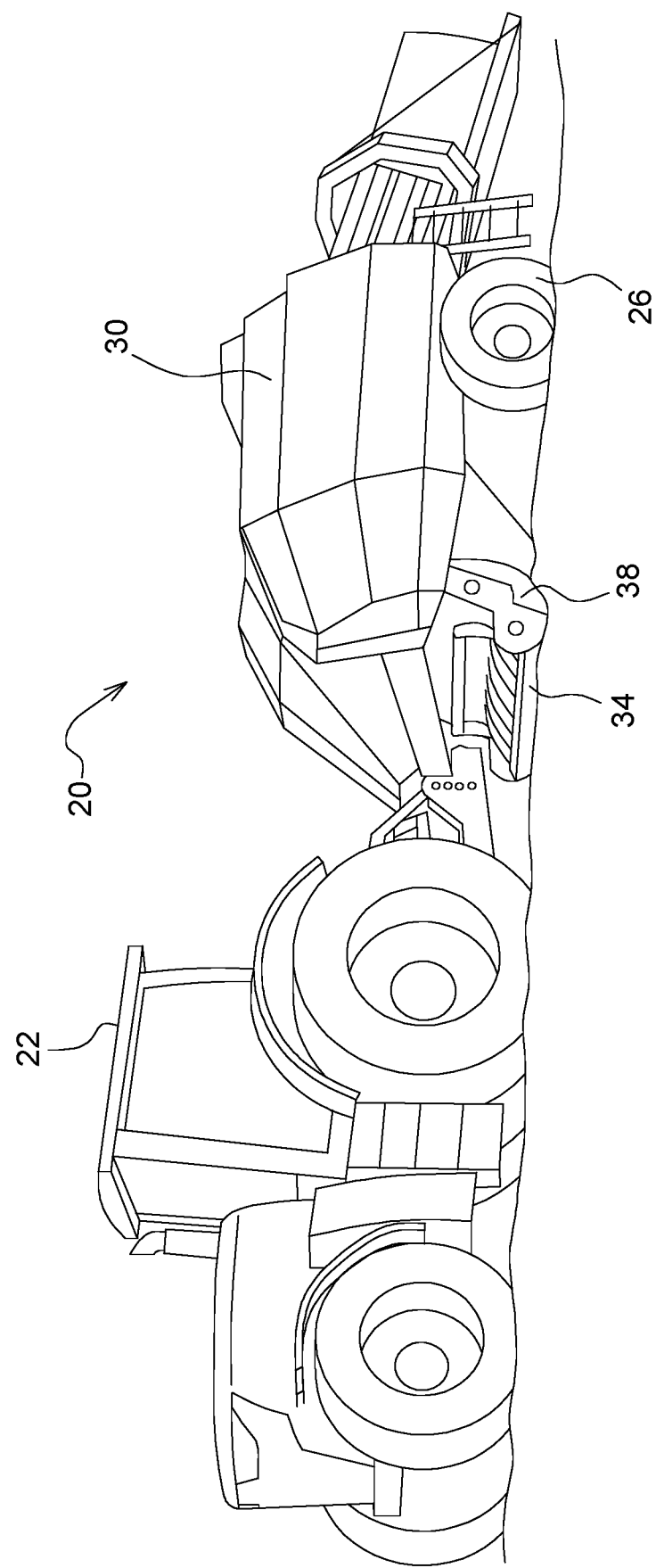
FIG. 1 is a schematic perspective view of a traction unit and a baler implement.
Figure 2:
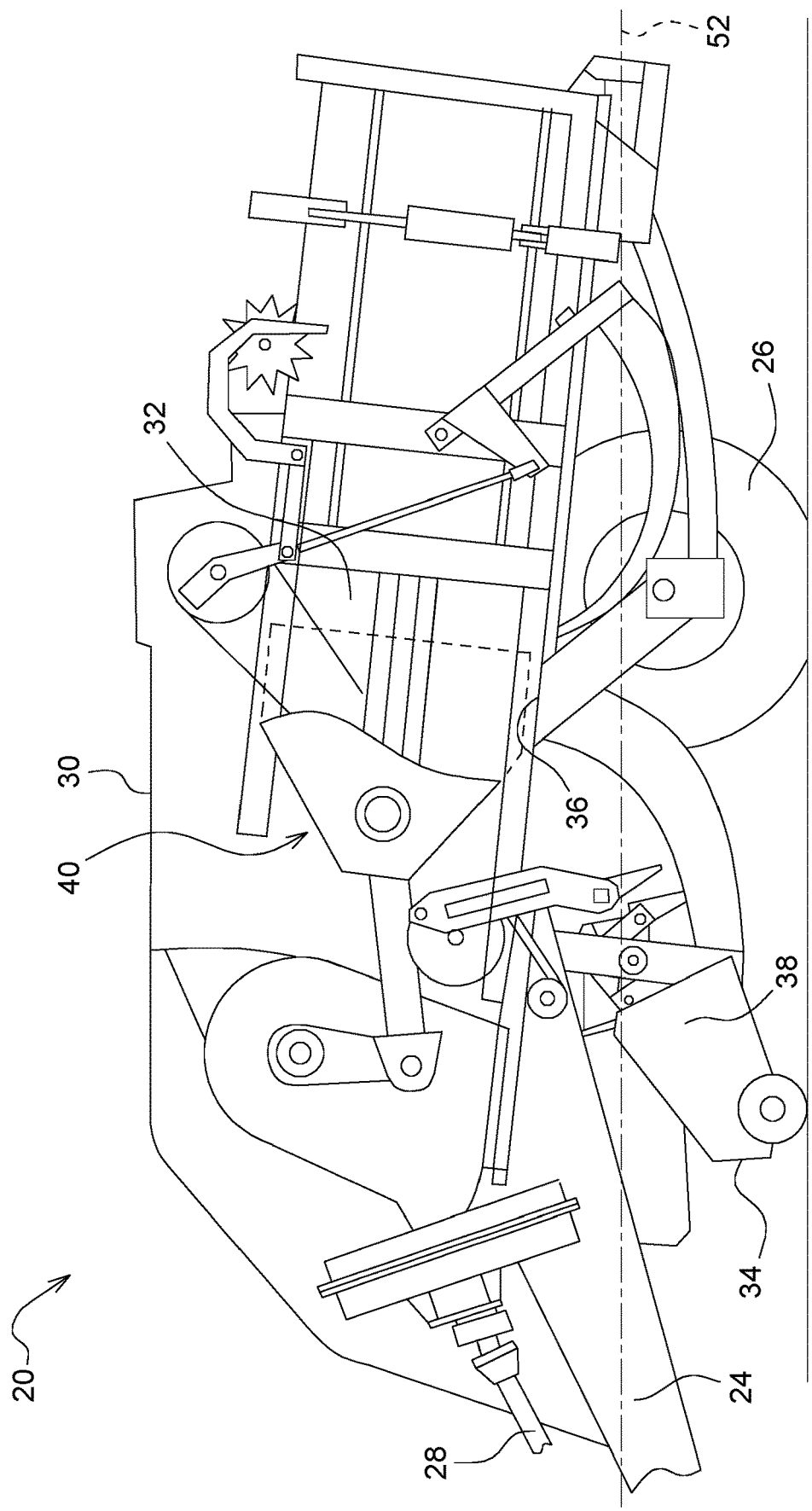
FIG. 2 is a schematic side view of the baler implement.
Figure 3:
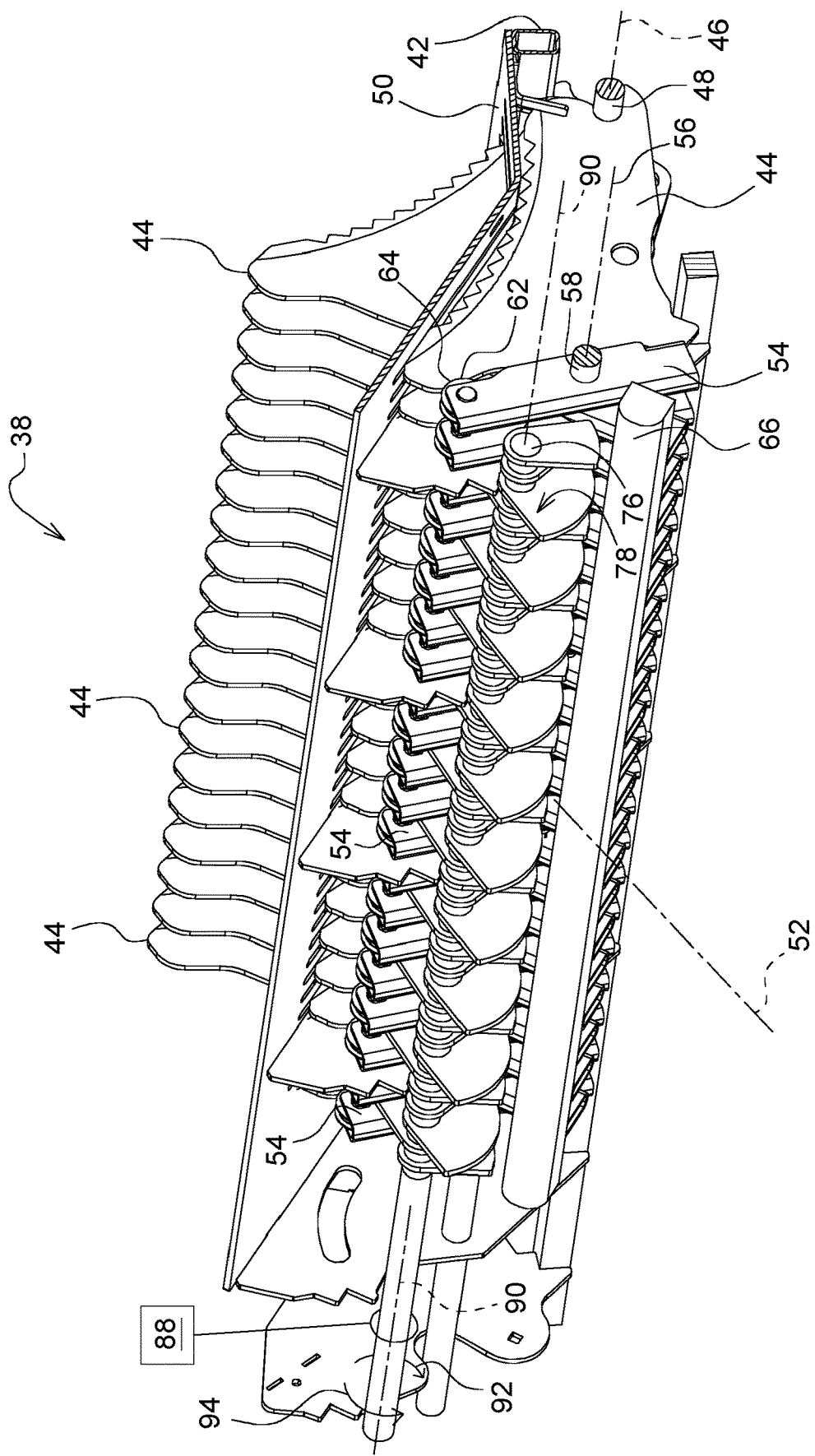
FIG. 3 is a schematic perspective view of a pre-cutter assembly.

Referring to the Figures, wherein like numerals indicate like parts throughout the several views, a baler implement is generally shown at 20 in FIG. 1. Referring to FIG. 1, the baler implement 20 is shown as a large square baler. However, it should be appreciated that the teachings of this disclosure may be applied to other baler platforms, such as round baler, and are not limited to the example implementation of the large square baler shown in the Figures and described herein.

As shown in FIG. 1, a traction unit 22 or vehicle, such as but not limited to a tractor, is coupled to the baler implement 20 for pulling and powering the baler implement 20. However, it should be appreciated that in other embodiments, the baler implement 20 may be self-propelled, in which case the traction unit 22 and the baler implement 20 are configured as a single, sell-propelled vehicle. The baler implement 20 may move across a field and gather and process crop material to form a bale. The baler implement 20 may then eject the formed bale from the rear of the baler implement 20.

Referring to FIG. 1, the exemplary embodiment of the baler implement 20 includes a frame 24, ground engaging devices 26, such as but not limited to wheels, and an input shaft 28, such as a power-take-off (PTO) shaft, which can receive rotational power from a power source, such as the tractor.

The baler implement 20 includes a housing 30 or body, which generally shields various internal components of the baler implement 20. The housing 30 is attached to and supported by the frame 24. The housing 30 includes multiple wall sections or panels that form and/or define a baling chamber 32. The baling chamber 32 may alternatively be referred to as a compression chamber for forming the bale.

The baler implement 20 includes a pick-up mechanism 34. The pick-up mechanism 34 is disposed proximate the forward end of the frame 24. The pick-up mechanism 34 gathers crop material from the ground surface and directs the gathered crop material toward and into an inlet 36 of the baling chamber 32. The pickup may include, but is not limited to lines, forks, augers, conveyors, baffles, etc., for gathering and moving the crop material. The baler implement 20 may be equipped with a pre-cutter assembly 38, disposed between the pickup and the inlet 36. As such, the pre-cutter assembly 38 is disposed downstream of the pickup and upstream of the inlet 36 relative to a direction of travel of the crop material. The pre-cutter assembly 38 cuts or chops the crop material into smaller pieces, and is described in greater detail below.

The pick-up mechanism 34 directs the gathered crop material through the pre-cuter assembly and into a bale formation system 40. The bale formation system 40 compresses the crop material into a bale, and secures the bale with a wrap or knotter system. The features, operation, and components of different bale formations systems, e.g., round baler systems and square baler systems, are known to those skilled in the art, are not pertinent to the teachings of this disclosure, and are therefore not described in greater detail herein.

Referring to FIGS. 2-5, the pre-cutter assembly 38 includes a support structure 42. The support structure 42 may include various components, such as but not limited to, plates, bars, brackets, etc., fastened together to form a frame or skeleton that supports the various components of the pre-cutter assembly 38 described in greater detail below. The specific shape, construction and components of the support structure 42 may vary based on design and application, are understood by those skilled in the art, and are therefore not described in greater detail herein.

The pre-cutter assembly 38 includes a plurality of knives 44. Each respective one of the plurality of knives 44 is rotatable relative to the support structure 42 for rotation about a knife rotation axis 46. The knives 44 may be coupled to the support structure 42 via a knife shaft 48 passing through each and defining the knife rotation axis 46. Each respective one of the knives 44 is rotatable between a retracted position and a deployed position. When the knives 44 are disposed in their respective retracted position, the knives 44 are positioned below a floor 50 of the support structure 42 and do not engage crop material. When the knives 44 are disposed in their respective deployed position, the knives 44 extend vertically upward through the floor 50 for engaging crop material. The knife rotation axis 46 extends transverse to a central longitudinal axis 52 of the frame 24. Each of the knives 44 includes a generally planar structure that is arranged in a generally upright or vertical orientation, such that the large planar surfaces extend vertically and are arranged perpendicular to the knife rotation axis 46, thereby presenting a thin knife 44 edge to the flow of the crop material. The knives 44 are spaced apart from each other, with each adjacent pair of the knives 44 forming a gap therebetween.

The pre-cutter assembly 38 further includes a plurality of engagement arms 54. Each respective one of the engagement arms 54 is arranged for engagement with a respective one of the plurality of knives 44. Each respective one of the engagement arms 54 is rotatable relative to the support structure 42 for rotation about an arm rotation axis 56. The engagement arms 54 may be coupled to the support structure 42 via an arm shaft 58 passing through each and defining the arm rotation axis 56. Each respective one of the engagement arms 54 is rotatable between a release position, shown in FIG. 4, and a latch position, shown in FIG. 5. When the engagement arms 54 are disposed in their respective release position, the engagement arms 54 are disengaged from the respective knife 44 associated therewith, allowing that respective knife 44 to fall into its respective retracted position. When the engagement arms 54 are disposed in their respective latch position, the engagement arms 54 are engaged with the respective knife 44 associated therewith in interlocking engagement to hold and secure that respective in its respective deployed position.

Figure 4:
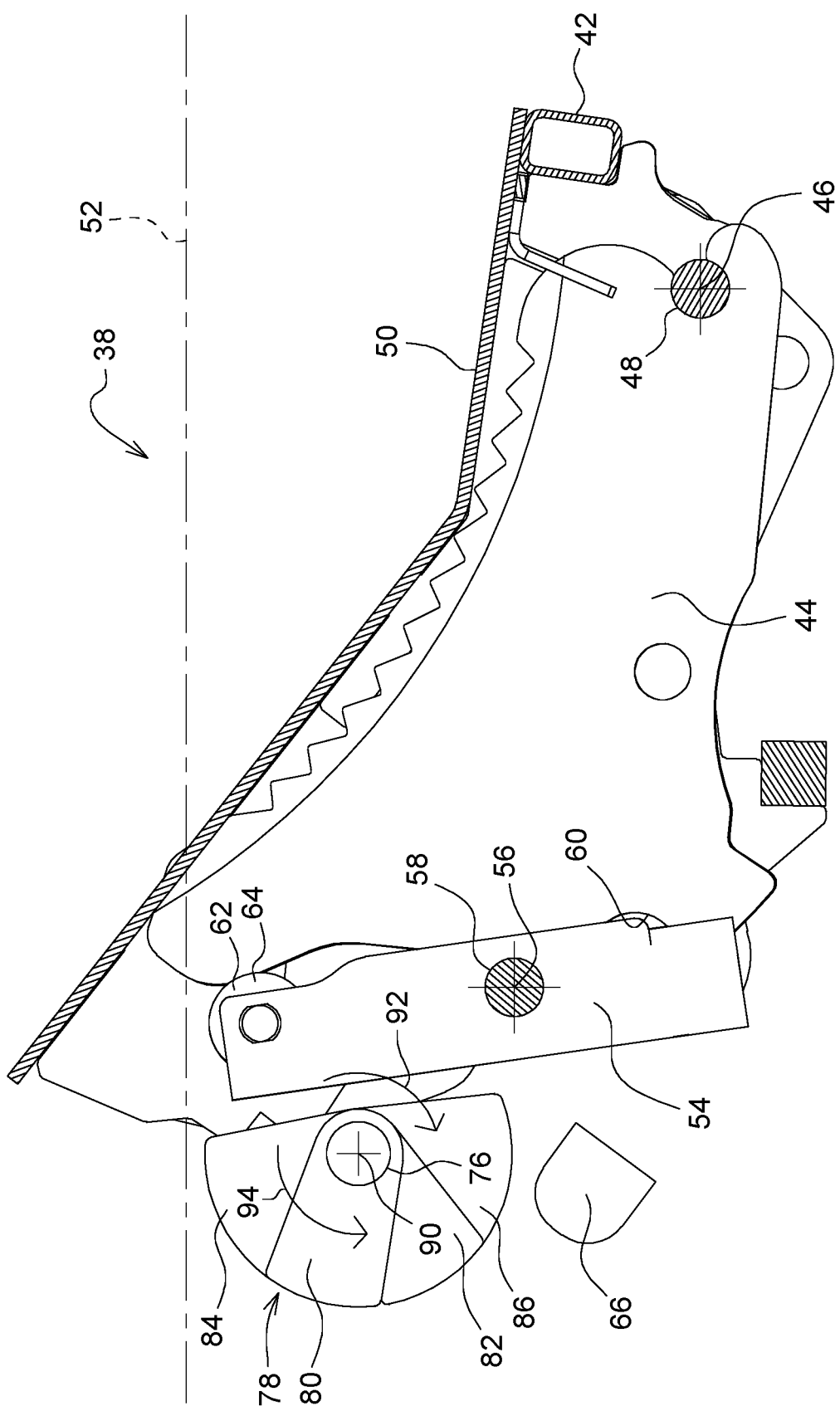
FIG. 4 is a schematic cross-sectional side view of the pre-cutter assembly showing a knife in a retracted position.
Figure 5:
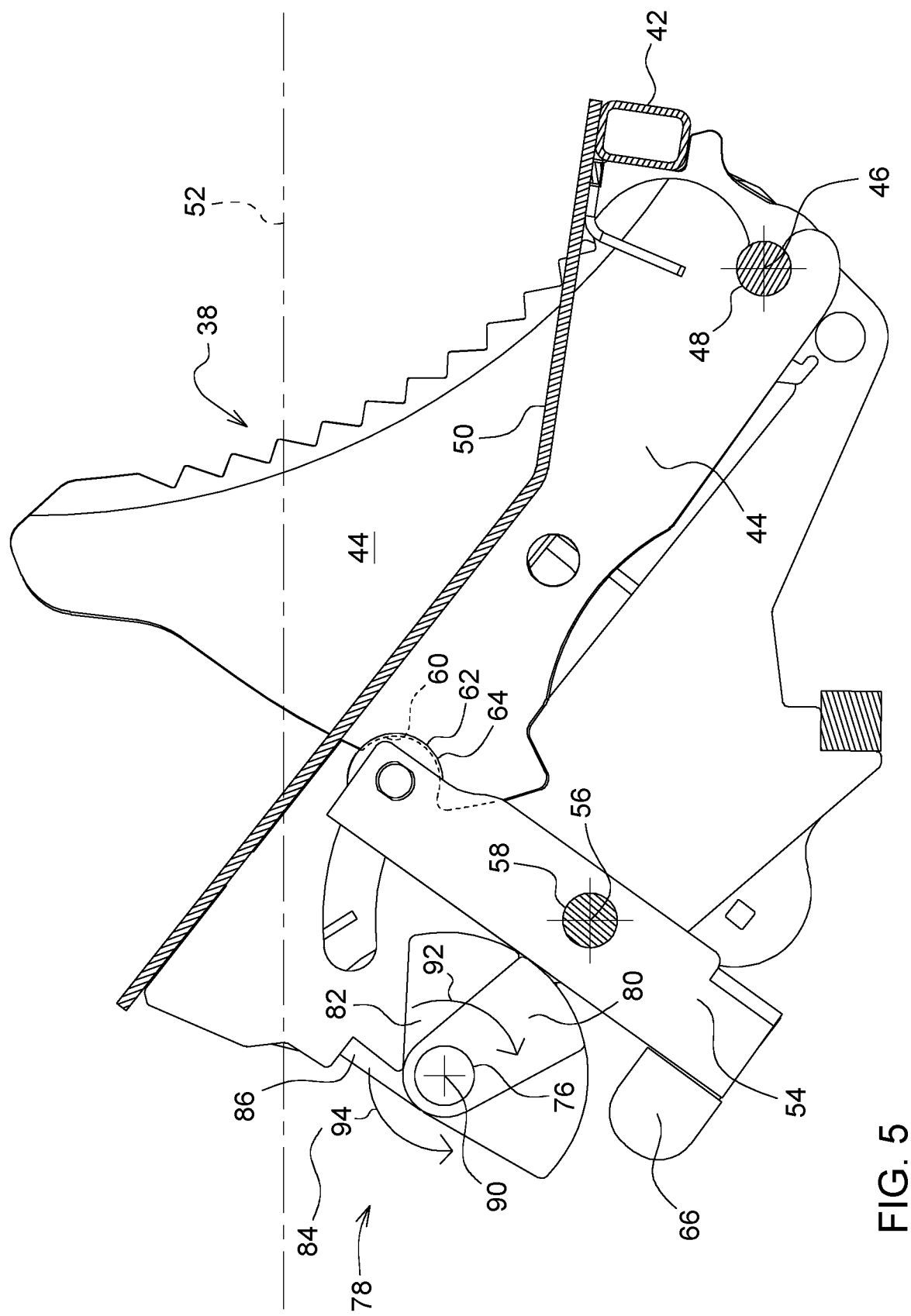
FIG. 5 is a schematic cross-sectional view of the pre-cutter assembly showing a knife in a deployed position.

Referring to FIGS. 4 and 5, in order to form the interlocking engagement between the respective engagement arm 54 and the knife 44 associated therewith, each respective one of the knives 44 may be formed to include a notch 60, and each respective one of the engagement arms 54 may include a portion 62 shaped to mate with and engage the notch 60 of the respective knife 44 associated therewith. The portion 62 of each of the engagement arms 54 configured to engage the notch 60 of the associated knife 44 may include a roller 64 rotatably attached thereto. For example, the roller 64 may define a cylindrical shape, and the notch 60 may define a semi-circular concave recess sized to mate with the cylindrical shape of the roller 64.

It should be appreciated that the knives 44 may be coupled to the support structure 42 in some manner other than the example implementation shown in the Figures and described herein. Similarly, the engagement arms 54 may be coupled to the support structure 42 in some manner other than the example implementation shown in the Figures and described herein. Additionally, the interlocking engagement between the engagement arms 54 and the knives 44 may differ from the example implementation shown in the Figures and described herein.

Referring to FIGS. 4 and 5, in one aspect of the disclosure, the pre-cutter assembly 38 may include a magnet 66. The magnet 66 is positioned for engagement with at least one of the engagement arms 54 when that engagement arm 54 is disposed in its respective latch position. The magnet 66 is operable to apply a magnetic force to the engagement arm 54 when engaged therewith for attracting the engagement arm 54 thereto. The magnet 66 is fixed in position relative to the support structure 42. As such, the engagement arms 54 move relative to the magnet 66. In the example implementation of the pre-cutter assembly 38 shown in the Figures and described herein, the magnet 66 is positioned for engagement with all of the engagement arms 54 when each respective one of the engagement arms 54 is disposed in its respective latch position. The magnet 66 is operable to apply the magnetic force to each of the engagement arms 54 when engaged therewith. While the example implementation shown in the Figures and described herein includes one magnet 66 for all of the engagement arms 54, it should be appreciated that the pre-cutter assembly 38 may include a plurality of magnets 66. For example, each respective engagement arm 54 may include a respective magnet 66. In other implementations, multiple magnets 66 may be employed, with each magnet 66 engaging multiple engagement arms 54.

The magnet 66 may include any device that is capable of selectively generating the required magnetic force to attract the respective engagement arms 54. As such, the magnet 66 may include a device that may be selectively engaged to generate the magnetic force, and then selectively disengaged to terminate the magnetic force. In one implementation, the magnet 66 may include, but is not limited to, an electromagnet 66 operable to generate the magnetic force in response to an electric signal applied thereto, and not generate the magnetic force in the absence of the electric signal. A magnitude of the electromagnetic force of the electromagnet may be varied and/or controlled to change the attraction between the magnet 66 and the engagement arms 54. For example, the magnitude of the electromagnetic force of the electromagnet may be varied and may be dependent upon a magnitude of the electric signal, e.g., the magnitude of the voltage applied to the electromagnet. By varying the voltage applied to the electromagnet, the magnitude of the electromagnetic force may be varied and controlled.

The magnet 66 is configured to generate the magnetic force to exhibit a defined magnitude. The magnetic force attracts the engagement bar to the magnet 66, such as shown in FIG. 4, thereby holding the engagement bar in position relative to the magnet 66. The magnetic force between one of the engagement arms 54 and the magnet 66 may be broken or interrupted, thereby allowing the engagement arm 54 to move relative to the magnet 66, such as shown in FIG. 5, in response to an impact force applied to the respective one of the knives 44 engaged with that engagement arm 54 and having a magnitude greater than the defined magnitude of the magnetic force. In other words, the engagement arm 54 will move relative to the magnet 66 in response to an impact against the knife 44 generating a force that is greater than the defined magnitude of the magnetic force generated between the magnet 66 and the engagement arm 54. Accordingly, an impact against a respective one of the knives 44 generating an impact force of sufficient magnitude causes the engagement arm 54 engaged with that knife 44 to move into its release position, thereby allowing that knife 44 to move into its respective retracted position. In so doing, the knife 44 may move into its respective retracted position below the floor 50 of the support structure 42 and avoid excessive damage from the impact.

In one aspect of the disclosure, the plurality of knives 44 may include at least a first set 68 of knives 44 and a second set 70 of knives 44. In the example implementation shown in the Figures and described herein, the plurality of knives 44 includes four sets of knives 44. Referring to FIGS. 6-13, the four sets of knives 44 include the first set 68 of knives 44, the second set 70 of knives 44, a third set 72 of knives 44, and a fourth set 74 of knives 44. The four sets of knives 44 are arranged in a repeated sequence. The sequence includes one of the first set 68 of knives 44 adjacent one of the second set 70 of knives 44, which is adjacent one of the third set 72 of knives 44, which is adjacent one of the fourth set 74 of knives 44. The sequence may then repeat, with one of the first set 68 of knives 44 adjacent the one of the fourth set 74 of knives 44 from the previous sequence. Each adjacent pair of the knives 44 within the sequence may be spaced an equal distance apart. However, in other implementations, the spacing between adjacent pairs of the knives 44 may vary within the sequence.

Figure 6:
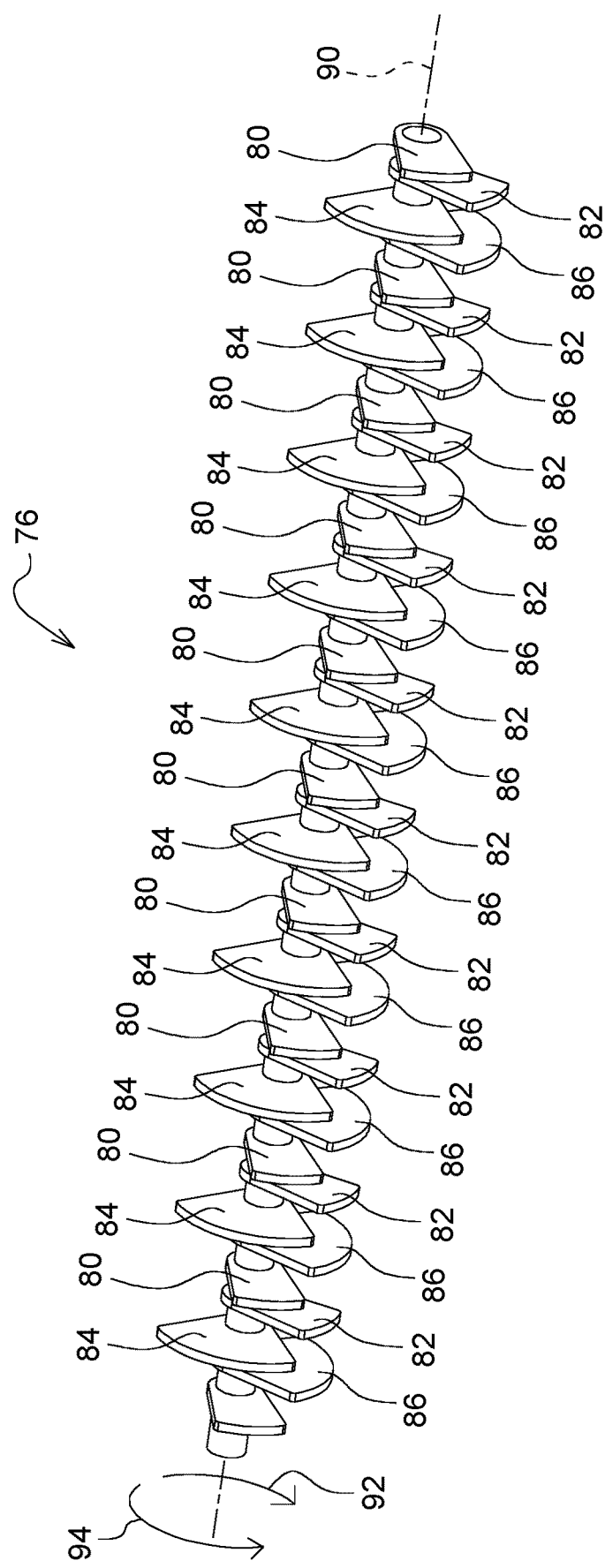
FIG. 6 is a schematic perspective view of a cam shaft of the pre-cutter assembly.
Figure 7:
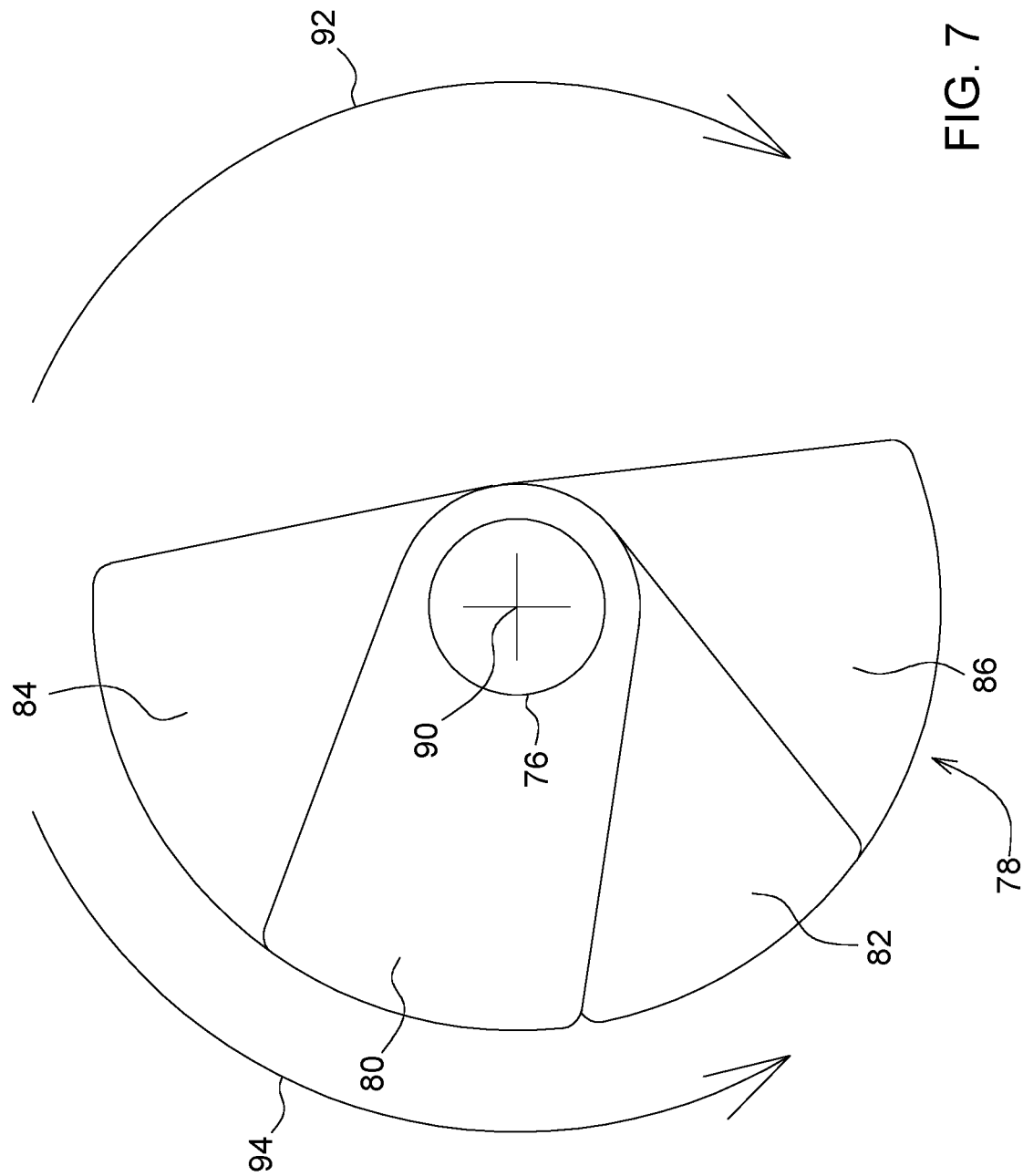
FIG. 7 is a schematic side view of the cam shaft.
Figure 8:
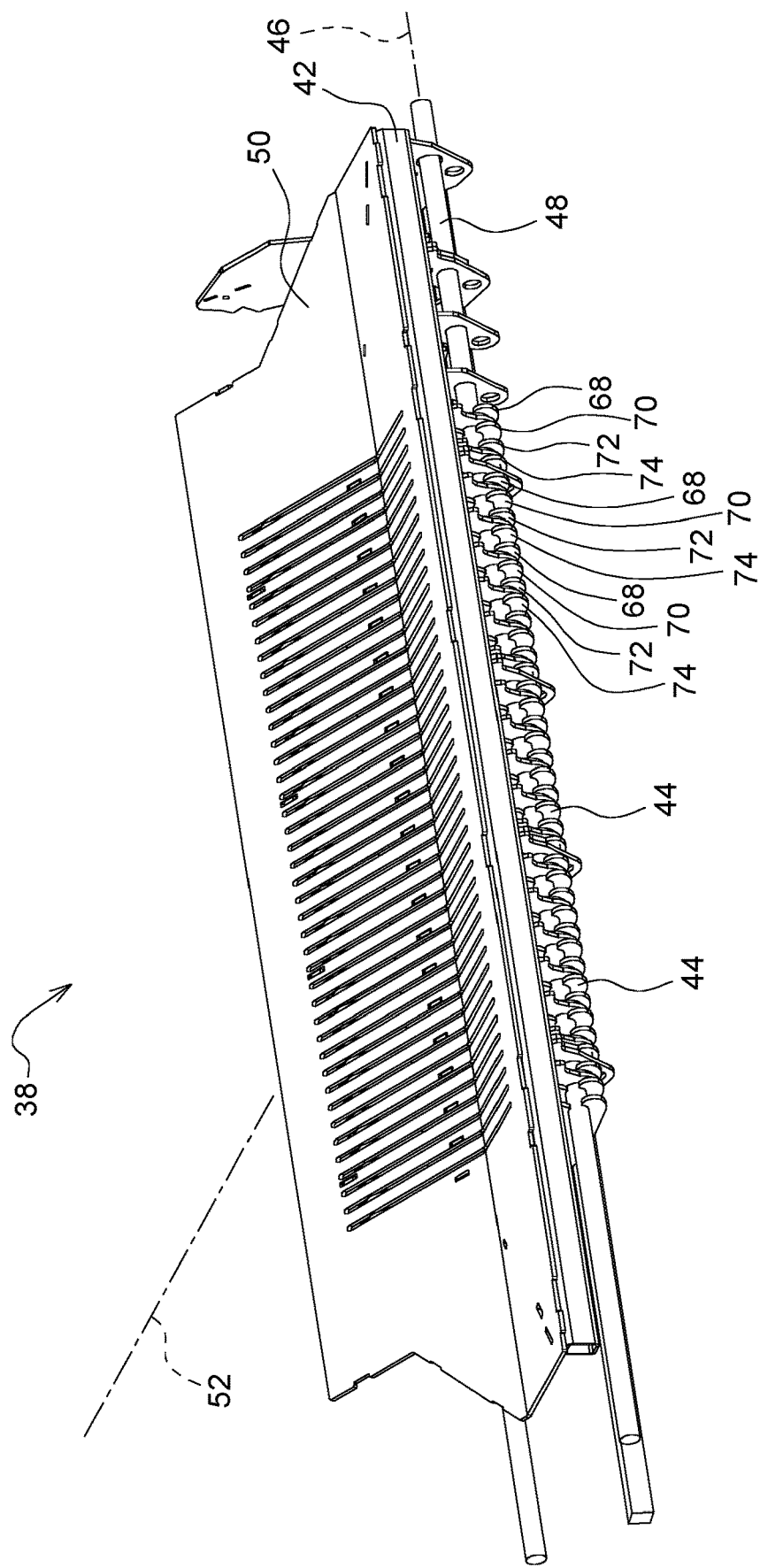
FIG. 8 is an enlarged schematic side view of the pre-cutter assembly with the cam shaft disposed in a neutral position.
Figure 9:
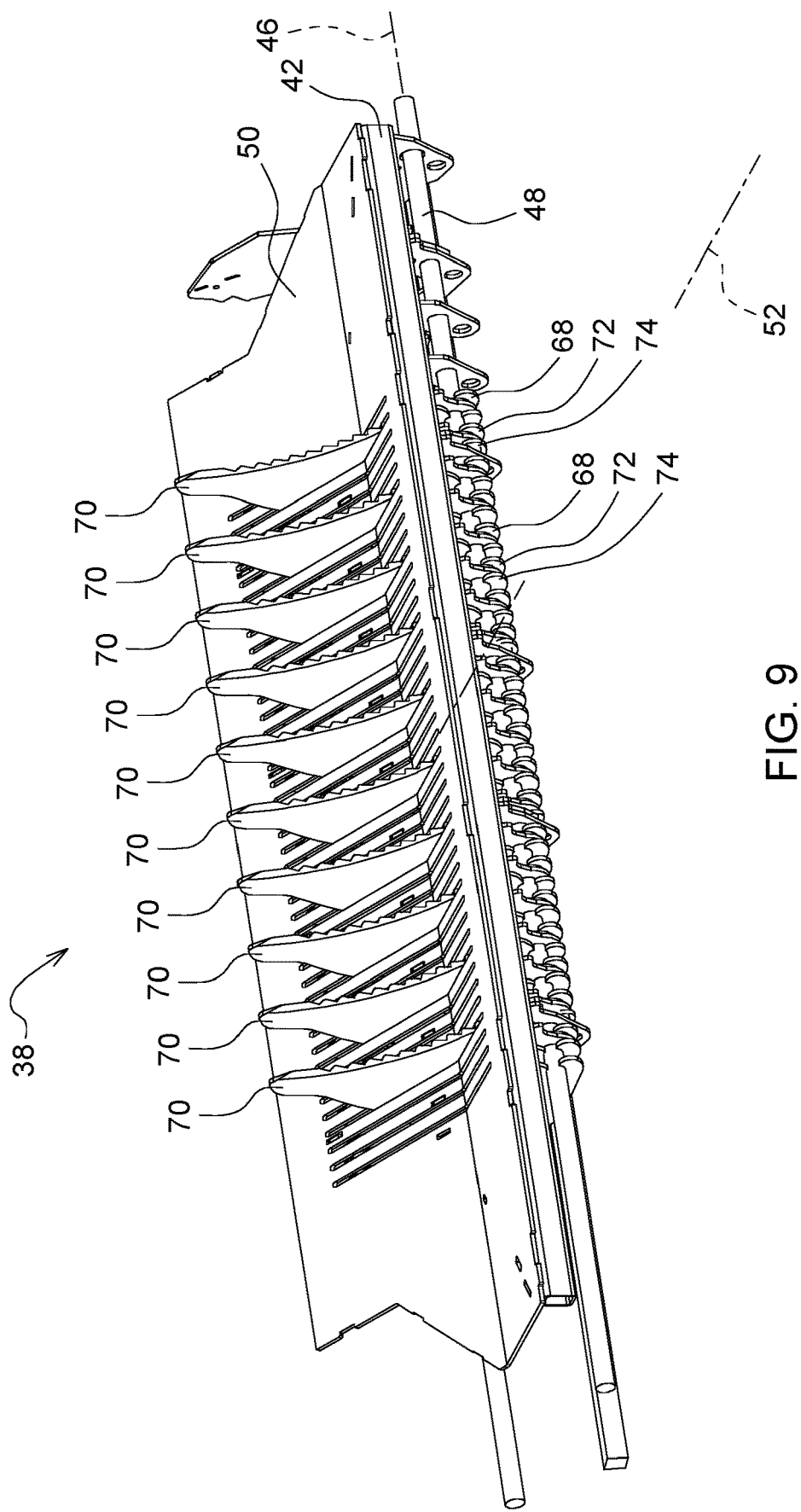
FIG. 9 is an enlarged schematic side view of the pre-cutter assembly with the cam shaft disposed in a first cam position.
Figure 10:
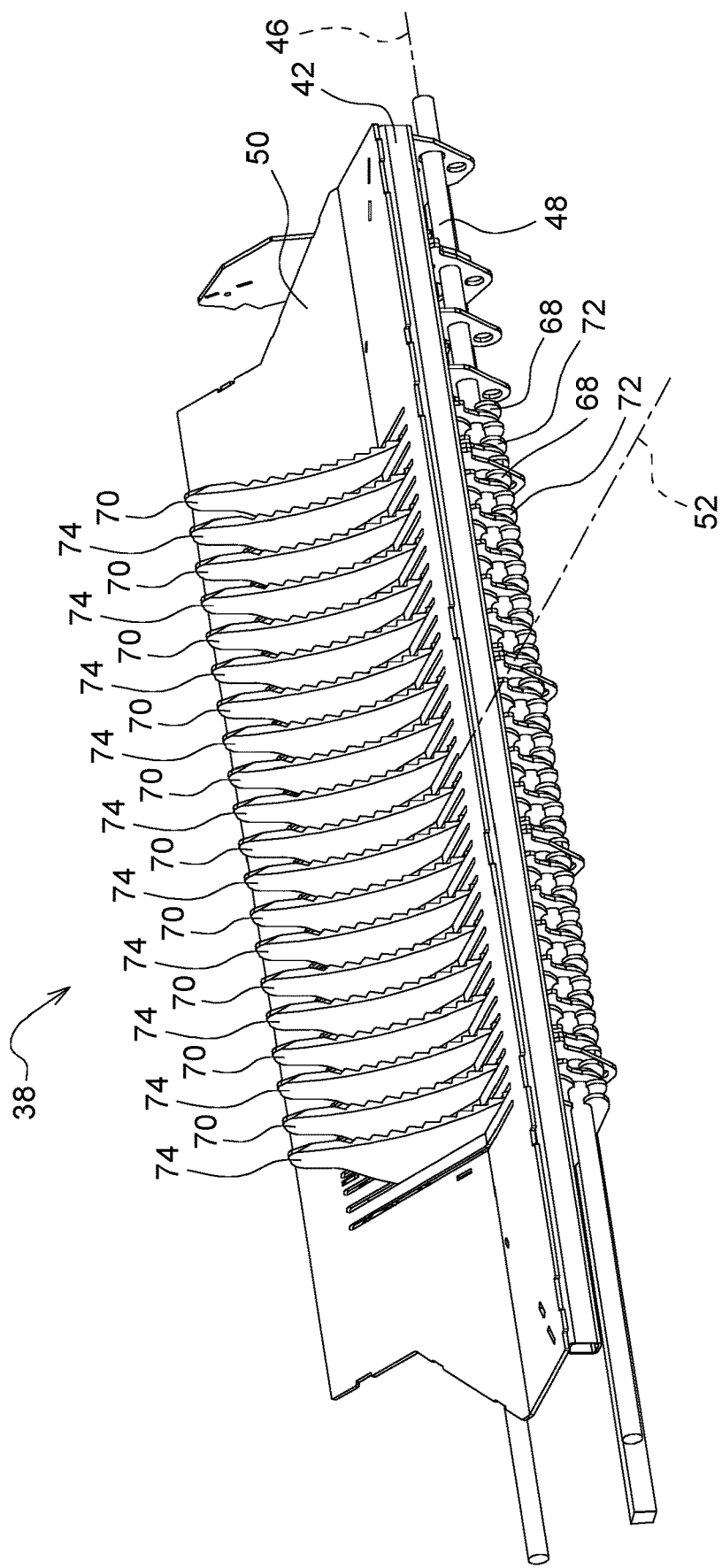
FIG. 10 is an enlarged schematic side view of the pre-cutter assembly with the cam shaft disposed in a second cam position.
Figure 11:
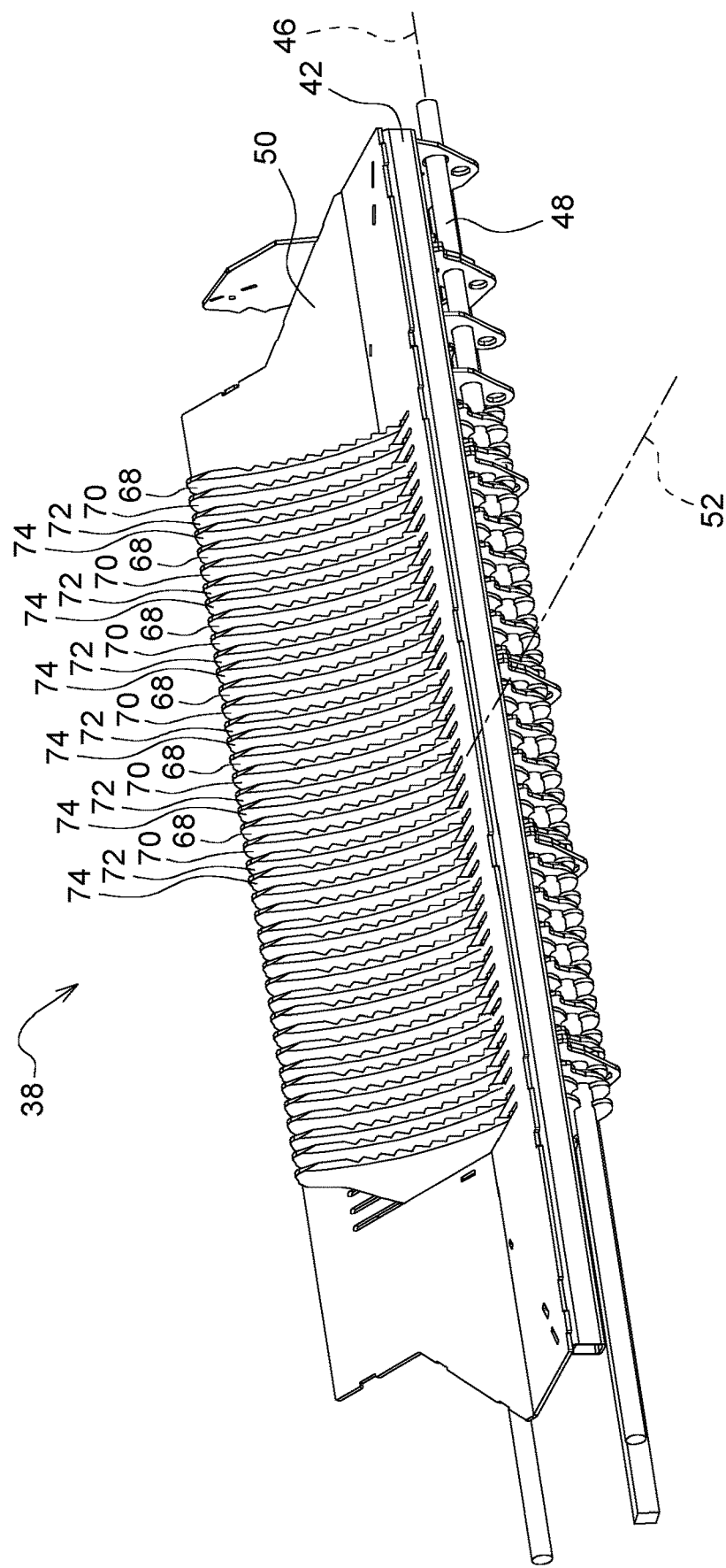
FIG. 11 is an enlarged schematic side view of the pre-cutter assembly with the cam shaft disposed in a third cam position.
Figure 12:
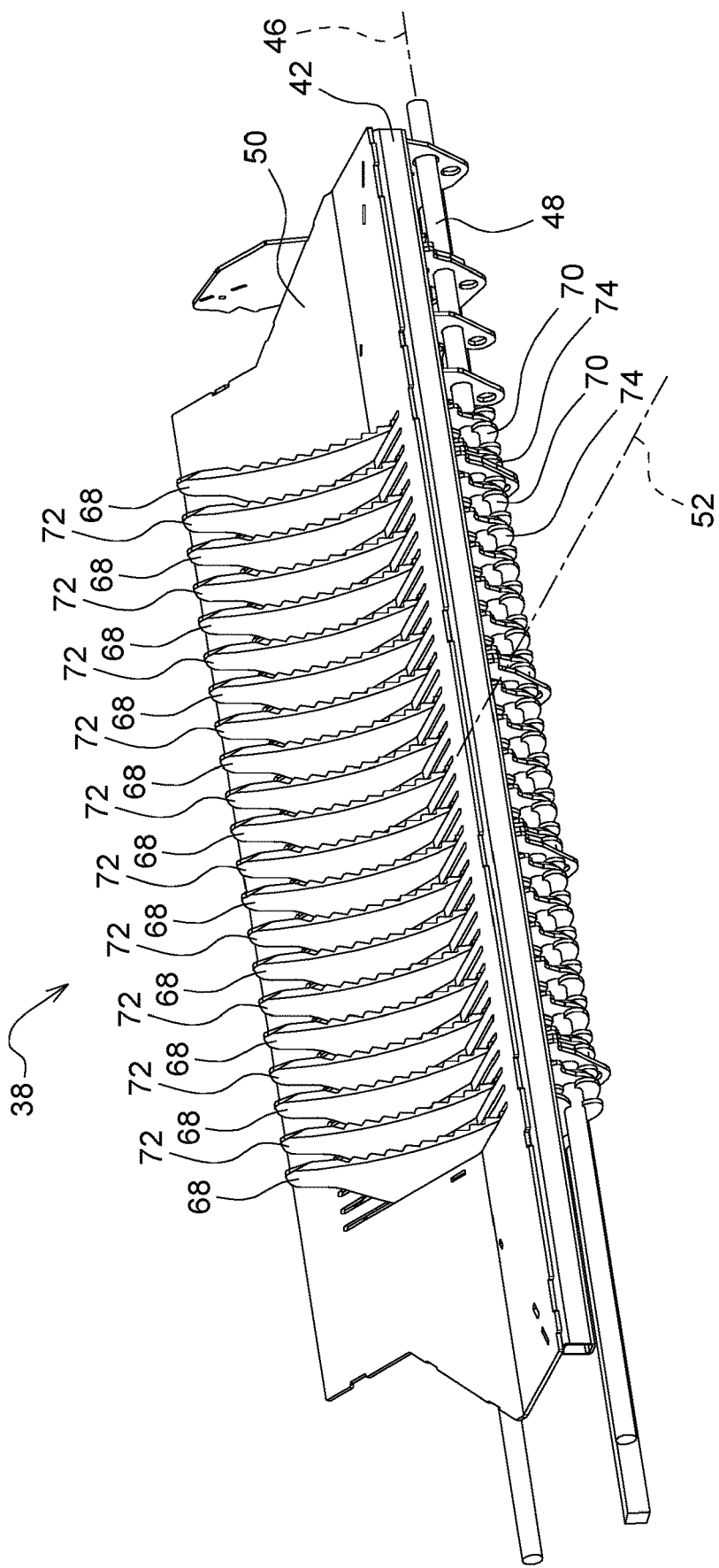
FIG. 12 is an enlarged schematic side view of the pre-cutter assembly with the cam shaft disposed in a fourth cam position.
Figure 13:
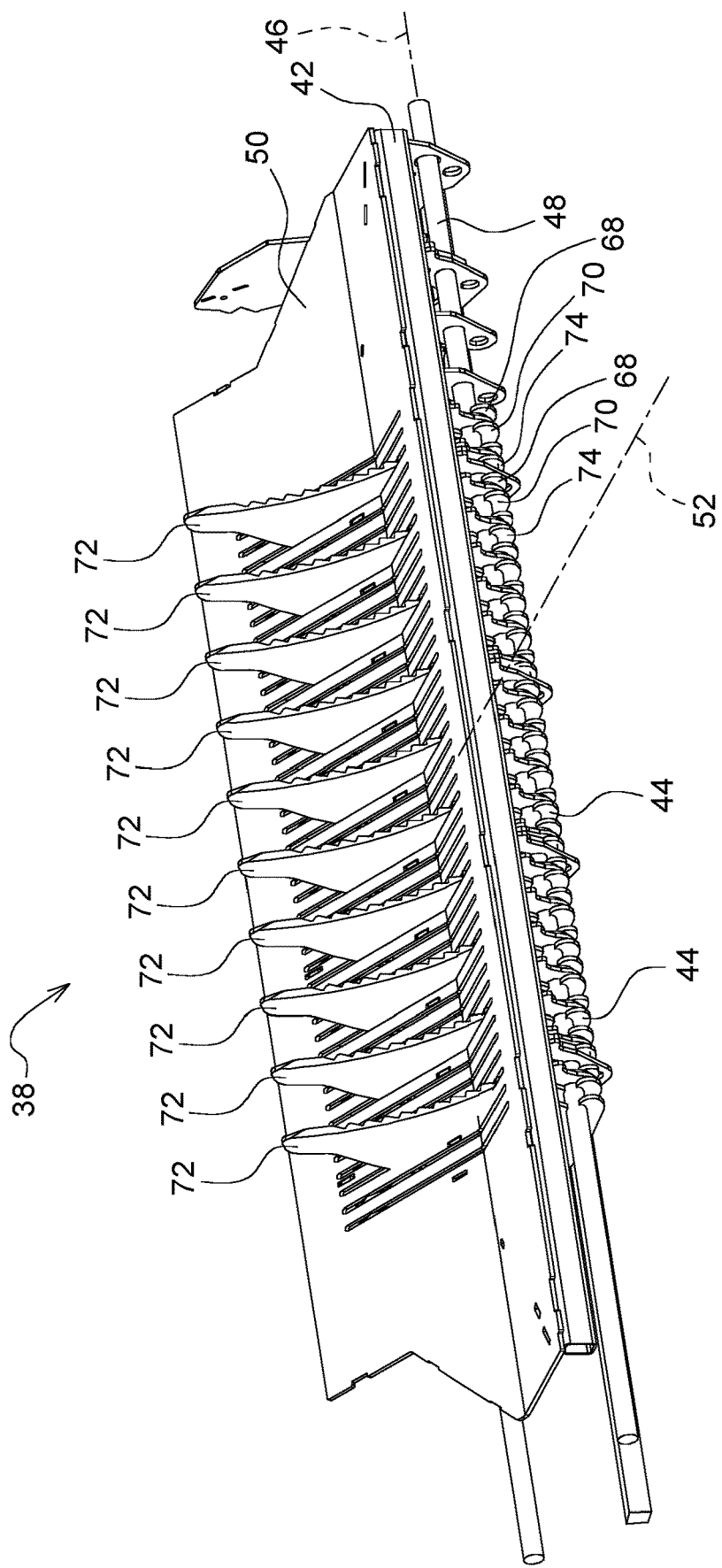
FIG. 13 is an enlarged schematic side view of the pre-cutter assembly with the cam shaft disposed in a fifth cam position.

As best shown in FIGS. 6 and 7, the pre-cutter assembly 38 may further include a cam shaft 76. The cam shaft 76 may include a set of cam lobes 78 for moving the engagement arms 54 and thereby moving the knives 44 from their respective retracted positions into their respective deployed positions. In one implementation, the cam shaft 76 may include multiple different sets of cam lobes 78. The cam shaft 76 of the example implementation shown in the Figures and described herein includes four sets of cam lobes 78, i.e., a first set 80 of cam lobes 78, a second set 82 of cam lobes 78, a third set 84 of cam lobes 78, and a fourth set 86 of cam lobes 78. The first set 80 of cam lobes 78 is positioned and configured for moving the engagement arms 54 associated with the first set 68 of knives 44. Each one of the first set 80 of cam lobes 78 is operable to move one engagement arm 54 associated with a respective one of the first set 68 of knives 44 from its release position to its latch position, to thereby move the associated knife 44 from its respective retracted position into its respective deployed position. Each one of the second set 82 of cam lobes 78 is operable to move one engagement arm 54 associated with a respective one of the second set 70 of knives 44 from its release position to its latch position, to thereby move the associated knife 44 from its respective retracted position into its respective deployed position. Each one of the third set 84 of cam lobes 78 is operable to move one engagement arm 54 associated with a respective one of the third set 72 of knives 44 from its release position to its latch position, to thereby move the associated knife 44 from its respective retracted position into its respective deployed position. Each one of the fourth set 86 of cam lobes 78 is operable to move one engagement arm 54 associated with a respective one of the fourth set 74 of knives 44 from its release position to its latch position, to thereby move the associated knife 44 from its respective retracted position into its respective deployed position.

The pre-cutter assembly 38 includes an actuator 88. The actuator 88 is coupled to the cam shaft 76 and is operable to rotate the cam shaft 76 about a cam axis 90. The actuator 88 may include, but is not limited to, an electric motor coupled to the cam shaft 76 and operable to rotate the cam shaft 76, a hydraulic motor coupled to the cam shaft 76 and operable to rotate the cam shaft 76, a gear train interconnecting the cam shaft 76 and a source of rotation, a belt and pulley system interconnecting the cam shaft 76 and a source of rotation, etc. In one implementation, the actuator 88 is operable to rotate the cam shaft 76 in a first rotational direction 92 about the cam axis 90 and a second rotational direction 94 about the cam axis 90. The second rotational direction 94 is opposite the first rotational direction 92. In other words, the actuator 88 may be configured to rotate the cam shaft 76 in both a clockwise and a counterclockwise direction. In other implementations, the actuator 88 may rotate the cam shaft 76 in only a single rotational direction.

The actuator 88 may move the cam shaft 76 between different positions to selectively engage different sets and/or combinations of sets of the knives 44. In the example implementation shown in the Figures and described herein, the cam shaft 76 defines six distinct positions, i.e., a neutral position shown in FIG. 8, a first cam position shown in FIG. 9, a second cam position shown in FIG. 10, a third cam position shown in FIG. 11, a fourth cam position shown in FIG. 12, and a fifth cam position shown in FIG. 13. The actuator 88 moves the cam shaft 76 between these different rotational positions.

The neutral position of the cam shaft 76 rotationally positions the cam shaft 76 about the cam axis 90 such that none of the lobes 78 of the cam shaft 76 engage or move any of the engagement arms 54. In the example implementation shown in the Figures and described herein, when the cam shaft 76 is disposed in the neutral position, none of the first set 80 of cam lobes 78, the second set 82 of cam lobes 78, the third set 84 of cam lobes 78, or the fourth set 86 of cam lobes 78 are engaged with a respective one of the plurality of engagement arms 54. As such, all of the engagement arms 54 may move into their respective release positions allowing all of the knives 44 to fall into their respective retracted positions.

In the example implementation shown in the Figures and described herein, the first cam position, the second cam position, the third cam position, the fourth cam position, and the fifth cam position each actuate respective sets of knives 44 or combination of sets of knives 44 to provide different cutting widths between adjacent deployed knives 44. When the cam shaft 76 is disposed in the first cam position, the second set 82 of lobes 78 of the cam shaft 76 actuate the engagement arms 54 associated with the second set 70 of knives 44 to move those engagement arms 54 into their respective latch positions and the second set 70 of knives 44 into their respective deployed positions.

When the cam shaft 76 is disposed in the second cam position, the second set 82 of cam lobes 78 of the cam shaft 76 actuate the engagement arms 54 associated with the second set 70 of knives 44 to move those engagement arms 54 into their respective latch positions and the second set 70 of knives 44 into their respective deployed positions, and the fourth set 86 of cam lobes 78 of the cam shaft 76 actuate the engagement arms 54 associated with the fourth set 74 of knives 44 to move those engagement arms 54 into their respective latch positions and the fourth set 74 of knives 44 into their respective deployed positions.

When the cam shaft 76 is disposed in the third cam position, the first set 80 of cam lobes 78 of the cam shaft 76 actuate the engagement arms 54 associated with the first set 68 of knives 44 to move those engagement arms 54 into their respective latch positions and the first set 68 of knives 44 into their respective deployed positions; the second set 82 of cam lobes 78 of the cam shaft 76 actuate the engagement arms 54 associated with the second set 70 of knives 44 to move those engagement arms 54 into their respective latch positions and the second set 70 of knives 44 into their respective deployed positions; the third set 84 of cam lobes 78 of the cam shaft 76 actuate the engagement arms 54 associated with the third set 72 of knives 44 to move those engagement arms 54 into their respective latch positions and the third set 72 of knives 44 into their respective deployed positions; and the fourth set 86 of cam lobes 78 of the cam shaft 76 actuate the engagement arms 54 associated with the fourth set 74 of knives 44 to move those engagement arms 54 into their respective latch positions and the fourth set 74 of knives 44 into their respective deployed positions.

The actuator 88 may position the cam shaft 76 in one of the first cam position, the second cam position, and the third cam position by rotating the cam shaft 76 in the first rotational direction 92 in sequence. In other words, the actuator 88 may rotate the cam shaft 76 in the first rotational direction 92 from the neutral position into the first cam position to achieve the first camp position. The actuator 88 may rotate the cam shaft 76 in the first rotational direction 92 from the neutral position into and through the first cam position and then into the second cam position to achieve the second cam position. The actuator 88 may rotate the cam shaft 76 in the first rotational direction 92 from the neutral position into and through the first cam position, into and through the second cam position, and then into the third cam position to achieve the third cam position. Rotating the cam shaft 76 in the second rotational direction 94 may move the cam shaft 76 back to the neutral position without going through the fifth cam position and the fourth cam position.

When the cam shaft 76 is disposed in the fifth cam position, the third set 84 of cam lobes 78 of the cam shaft 76 actuate the engagement arms 54 associated with the third set 72 of knives 44 to move those engagement arms 54 into their respective latch positions and the third set 72 of knives 44 into their respective deployed positions.

When the cam shaft 76 is disposed in the fourth cam position, the first set 80 of cam lobes 78 of the cam shaft 76 actuate the engagement arms 54 associated with the first set 68 of knives 44 to move those engagement arms 54 into their respective latch positions and the first set 68 of knives 44 into their respective deployed positions, and the third set 84 of cam lobes 78 of the cam shaft 76 actuate the engagement arms 54 associated with the third set 72 of knives 44 to move those engagement arms 54 into their respective latch positions and the third set 72 of knives 44 into their respective deployed positions.

The actuator 88 may position the cam shaft 76 in one of the fifth cam position, the fourth cam position, and the third cam position by rotating the cam shaft 76 in the second rotational direction 94 in sequence. In other words, the actuator 88 may rotate the cam shaft 76 in the second rotational direction 94 from the neutral position into the fifth cam position to achieve the fifth camp position. The actuator 88 may rotate the cam shaft 76 in the second rotational direction 94 from the neutral position into and through the fifth cam position and then into the fourth cam position to achieve the fourth cam position. The actuator 88 may rotate the cam shaft 76 in the second rotational direction 94 from the neutral position into and through the fifth cam position, into and through the fourth cam position, and then into the third cam position to achieve the third cam position. Rotating the cam shaft 76 in the first rotational direction 92 may move the cam shaft 76 back to the neutral position without going through the first cam position and the second cam position.

A method of controlling the pre-cutter assembly 38 of the baler implement 20 is also provided. The method includes deactivating the magnet 66. If the magnet 66 includes the electromagnet 66 described above, it should be appreciated that deactivating the magnet 66 includes stopping or interrupting the electrical signal to the magnet 66 to thereby cease generation of the magnet 66 force. The magnet 66 is deactivated, thereby allowing all of the engagement arms 54 to move into their respective release positions, and the knives 44 associated with each to fall into their respective retracted positions below the floor 50 of the support structure 42. If the pre-cutter assembly 38 is equipped with the cam shaft 76 described above, the magnet 66 is deactivated with the cam shaft 76 disposed in its neutral position, and prior to rotating the cam shaft 76 out of the neutral position.

A set of the plurality of knives 44 may then be positioned in their respective deployed positions. As noted above, the plurality of knives 44 may include multiple different sets. A specific set or a combination of sets may be positioned in their respective deployed positions. If the pre-cutter assembly 38 is equipped with the cam shaft 76 described above, then the desired set of knives 44 may be positioned in their respective deployed position by rotating the cam shaft 76 about the cam axis 90 from the neutral position to one of the defined cam positions, e.g., one of the first cam position, the second cam position, the third cam position, the fourth cam position, or the fifth cam position. As described above, the cam shaft 76 includes multiple sets of cam lobes 78, with each individual set of cam lobes 78 positioned to engage one of the sets of knives 44 in one or more of the different cam positions. Accordingly, by rotating the cam shaft 76 to the desired cam position, the one or more of the sets of knives 44 may be engaged and moved into their respective deployed positions.

With the cam shaft 76 disposed in the desired cam position to activate the desired set or combination of sets of knives 44, the magnet 66 may be engaged to generate the magnetic force to secure the set or combination of sets of the knives 44 in the deployed position. The engagement arms 54 associated with each of the set or combination of sets of the knives 44 moved into their respective deployed position are disposed in contact with the magnet 66. When the magnet 66 is activated to generate the magnetic force, the magnetic force from the magnet 66 attracts the engagement arms 54 in contact with the magnet 66 and secures them in place. The other engagement arms 54, not contacting the magnet 66, are not held in place and may remain in their respective release positions. If the magnet 66 includes the electromagnet 66 described above, it should be appreciated that activating the magnet 66 includes communicating the electrical signal to the magnet 66 to thereby generate the magnet 66 force.

With the magnet 66 activated to generate the magnetic force that holds the engagement arms 54 contacting the magnet 66 in place, thereby holding the knives 44 associated with those engagement arms 54 in their respective deployed position, the cam shaft 76 may be rotated back to the neutral position in which none of the cam lobes 78 of the cam shaft 76 are engaged with the engagement arms 54. In the example implementation of the pre-cutter assembly 38 shown in the Figures and described herein, the cam shaft 76 may be rotated in either the first rotational direction 92 or the second rotational direction 94 prior to engaging the magnet 66 to deploy the desired set or combination of sets of knives 44.

When the desired set or combination of sets of knives 44 are deployed and after the magnet 66 is once again activated, the cam shaft 76 may be rotated in the opposite rotational direction back to the neutral position. Due to the unique sequencing of the sets of the knives 44 for each sequential cam position, by rotating the cam shaft 76 in the opposite rotational direction compared to the deployment of the knives 44, no additional sets of knives 44 are deployed after the magnet 66 has been activated to hold the deployed knives 44 in position. For example, the cam shaft 76 may be rotated in the first rotational direction 92 to the second cam position to activate both the second set 70 of knives 44 and the fourth set 74 of knives 44. After the magnet 66 is activated to secure the second set 70 of knives 44 and the fourth set 74 of knives 44 in the deployed position, the cam shaft 76 may be rotated in the second rotational direction 94, i.e., the opposite direction, back to the neutral position without activating either of the first set 68 of knives 44 or the third set 72 of knives 44.

Once the cam shaft 76 is back in the neutral position, with the lobes 78 of the cam shaft 76 disengaged from the associated engagement arms 54, an impact against the knives 44 may cause the knife 44 to break the magnetic bond between the associated engagement arm 54 and the magnet 66, thereby allowing the associated engagement arm 54 to move into its respective release position and the impacted knife 44 to drop below the floor 50 of the support structure 42 and move into its respective retracted position to avoid damage to the knife 44.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A pre-cutter assembly for a baler implement, the pre-cutter assembly comprising:
   a support structure;
   a plurality of knives, with each respective one of the plurality of knives rotatable relative to the support structure for rotation about a knife rotation axis between a retracted position and a deployed position;
   a plurality of engagement arms, with each respective one of the plurality of engagement arms arranged for engagement with a respective one of the plurality of knives, wherein each respective one of the plurality of engagement arms is rotatable relative to the support structure for rotation about an arm rotation axis between a release position and a latch position;
   a magnet positioned for engagement with at least one of the plurality of engagement arms when the at least one of the plurality of engagement arms is disposed in its respective latch position, wherein the magnet is operable to apply a magnetic force to the at least one of the plurality of engagement arms when engaged therewith for attracting the at least one of the plurality of engagement arms thereto; and
   wherein the magnet is configured to generate the magnetic force to exhibit a defined magnitude, whereby the magnetic force between the at least one of the plurality of engagement arms and the magnet is breakable in response to an impact force applied to the respective one of the plurality of knives engaged with the at least one of the plurality of engagement arms and having a magnitude greater than the defined magnitude of the magnetic force, whereby an impact against the respective one of the plurality of knives generating the impact force causes the at least one of the plurality of engagement arms engaged therewith to move into its release position and the respective one of the plurality of knives engaged with the at least one of the plurality of engagement arms to move into its retracted position.

2. The pre-cutter assembly set forth in claim 1, wherein the magnet is positioned for engagement with all of the plurality of engagement arms when each respective one of the plurality of engagement arms is disposed in its respective latch position, wherein the magnet is operable to apply the magnetic force to each of the plurality of engagement arms when engaged therewith.

3. The pre-cutter assembly set forth in claim 1, wherein the magnet includes an electromagnet operable to generate the magnetic force in response to an electric signal applied thereto.

4. The pre-cutter assembly set forth in claim 3, wherein a magnitude of the electromagnetic force of the electromagnet is dependent upon a magnitude of the electric signal.

5. The pre-cutter assembly set forth in claim 1, wherein each respective one of the plurality of knives includes notch, and wherein each respective one of the plurality of engagement arms includes a portion shaped to mate with and engage the notch of the respective one of the plurality of knives engaged therewith.

6. The pre-cutter assembly set forth in claim 5, wherein the portion of each respective one of the plurality of engagement arms includes a roller rotatably attached thereto.

7. A pre-cutter assembly for a baler implement, the pre-cutter assembly comprising:
   a support structure;
   a plurality of knives, with each respective one of the plurality of knives rotatable relative to the support structure for rotation about a knife rotation axis between a retracted position and a deployed position;
   a plurality of engagement arms, with each respective one of the plurality of engagement arms arranged for engagement with a respective one of the plurality of knives, wherein each respective one of the plurality of engagement arms is rotatable relative to the support structure for rotation about an arm rotation axis between a release position and a latch position;
   a magnet positioned for engagement with at least one of the plurality of engagement arms when the at least one of the plurality of engagement arms is disposed in its respective latch position, wherein the magnet is operable to apply a magnetic force to the at least one of the plurality of engagement arms when engaged therewith for attracting the at least one of the plurality of engagement arms thereto;
   wherein the plurality of knives includes a first set of knives and a second set of knives; and
   a cam shaft having a first set of cam lobes and a second set of cam lobes, wherein each of the first set of cam lobes is positioned for engaging a respective one of the plurality of engagement arms engaged with one of the first set of knives to move the respective engagement arm from its release position to its latch position, and wherein each of the second set of cam lobes is positioned for engaging a respective one of the plurality of engagement arms engaged with one of the second set of knives to move the respective engagement arm from its release position to its latch position.

8. The pre-cutter assembly set forth in claim 7, further comprising an actuator coupled to the cam shaft and operable to rotate the cam shaft about a cam axis.

9. The pre-cutter assembly set forth in claim 8, wherein the actuator is operable to rotate the cam shaft in a first rotational direction about the cam axis and a second rotational direction about the cam axis, wherein the second rotational direction is opposite the first rotational direction.

10. The pre-cutter assembly set forth in claim 7, wherein the cam shaft includes a neutral position in which none of the first set of cam lobes and the second set of cam lobes are engaged with a respective one of the plurality of engagement arms, whereby all of the plurality of engagement arms may move into their respective release positions.

11. A pre-cutter assembly for a baler implement, the pre-cutter assembly comprising:
   a support structure;
   a knife rotatable relative to the support structure for rotation about a knife rotation axis between a retracted position and a deployed position;
   an engagement arm rotatable relative to the support structure for rotation about an arm rotation axis between a latch position securing the knife in the deployed position, and a release position allowing the knife to move into the retracted position;
   a magnet positioned for engagement with the engagement arm when the engagement arm is disposed in the latch position, wherein the magnet is operable to apply a magnetic force to the engagement arm when engaged with the engagement arm to hold the engagement arm in the latch position thereby securing the knife in the deployed position;

wherein the magnet includes an electromagnet operable to generate the magnetic force in response to an electric signal applied thereto; and wherein the magnet is configured to generate the magnetic force to exhibit a defined magnitude, whereby the magnetic force between the engagement arm and the magnet is breakable in response to an impact force applied to the knife engaged with the engagement arm and having a magnitude greater than the defined magnitude of the magnetic force, whereby an impact against the knife generating the impact force causes the engagement arm engaged therewith to move into its release position and the knife engaged with the engagement arm to move into its retracted position.

12. The pre-cutter assembly set forth in claim 11, wherein a magnitude of the electromagnetic force of the electromagnet is dependent upon a magnitude of the electric signal.

13. A pre-cutter assembly for a baler implement, the pre-cutter assembly comprising:
a support structure;
a plurality of knives, with each respective one of the plurality of knives rotatable relative to the support structure for rotation about a knife rotation axis between a retracted position and a deployed position;
wherein the plurality of knives includes a first set of knives and a second set of knives;
a plurality of engagement arms, with each respective one of the plurality of engagement arms arranged for engagement with a respective one of the plurality of knives, wherein each respective one of the plurality of engagement arms is rotatable relative to the support structure for rotation about an arm rotation axis between a release position and a latch position;
a cam shaft having a first set of cam lobes and a second set of cam lobes, wherein each of the first set of cam lobes is positioned for engaging a respective one of the plurality of engagement arms engaged with one of the first set of knives to move the respective engagement arm from its release position to its latch position, and wherein each of the second set of cam lobes is positioned for engaging a respective one of the plurality of engagement arms engaged with one of the second set of knives to move the respective engagement arm from its release position to its latch position.

14. The pre-cutter assembly set forth in claim 13, further comprising an actuator coupled to the cam shaft and operable to rotate the cam shaft about a cam axis.

15. The pre-cutter assembly set forth in claim 14, wherein the actuator is operable to rotate the cam shaft in a first rotational direction about the cam axis and a second rotational direction about the cam axis, wherein the second rotational direction is opposite the first rotational direction.

16. The pre-cutter assembly set forth in claim 13, wherein the cam shaft includes a neutral position in which none of the first set of cam lobes and none of the second set of cam lobes are engaged with a respective one of the plurality of engagement arms, whereby all of the plurality of engagement arms may move into their respective release positions.

17. The pre-cutter assembly set forth in claim 13, further comprising a magnet positioned for engagement with at least one of the plurality of engagement arms when the at least one of the plurality of engagement arms is disposed in its respective latch position, wherein the magnet is operable to apply a magnetic force to the at least one of the plurality of engagement arms when engaged therewith for attracting the at least one of the plurality of engagement arms thereto.

18. A method of controlling a pre-cutter assembly of a baler implement, the method comprising:
rotating a cam shaft about a cam axis from a neutral position to one of a first cam position and a second cam position, wherein the cam shaft includes a first set of cam lobes and a second set of cam lobes, wherein each of the first set of cam lobes is positioned for engaging a respective one of a plurality of engagement arms engaged with one of a first set of knives to move the respective engagement arm from a release position to a latch position when in the first cam position, and wherein each of the second set of cam lobes is positioned for engaging a respective one of the plurality of engagement arms engaged with one of a second set of knives to move the respective engagement arm from a release position to a latch position when in the second cam position; and
activating an electromagnet to generate a magnetic force attracting the engagement arms engaged therewith determined by the rotational position of the cam shaft being one of the first cam position or the second cam position; and
rotating the cam shaft to the neutral position in which none of the first set of cam lobes and none of the second set of cam lobes are engaged with a respective one of the plurality of engagement arms.

19. The method set forth in claim 18, further comprising deactivating the electromagnet prior to rotating the cam shaft from the neutral position to one of the first cam position and the second cam position.

* * * * *